United States Patent [19]
de Fontenay et al.

[11] Patent Number: 5,259,600
[45] Date of Patent: Nov. 9, 1993

[54] ELASTIC CONNECTION DEVICE FOR MOTOR VEHICLE SUSPENSION SYSTEMS

[75] Inventors: Etienne de Fontenay, Decize; Patrick Parisot, Elancourt, both of France

[73] Assignee: Caoutchouc Manufacture et Plastiques, Versailles, France

[21] Appl. No.: 900,956

[22] Filed: Jun. 18, 1992

[30] Foreign Application Priority Data

Jun. 19, 1991 [FR] France .................. 91 07632

[51] Int. Cl.$^5$ ............................................. B60G 13/08
[52] U.S. Cl. .................................... 267/220; 267/219
[58] Field of Search ............... 267/35, 140.12–140.15, 267/141.1–141.5, 141.7, 219, 220, 64.23, 64.27, 322.21; 248/562, 636, 638; 280/672, 693, 698, 689; 180/300, 312, 902

[56] References Cited

U.S. PATENT DOCUMENTS

| | | | |
|---|---|---|---|
| 2,318,437 | 5/1943 | Vickers | 267/35 |
| 4,813,513 | 3/1989 | Le Salver et al. | 248/636 |
| 4,854,562 | 8/1989 | Fontenay et al. | 267/292 |
| 5,078,369 | 1/1992 | Pascal et al. | 267/140.13 |

FOREIGN PATENT DOCUMENTS

| | | |
|---|---|---|
| 898055 | 9/1940 | European Pat. Off. . |
| 0028692 | 5/1981 | European Pat. Off. . |
| 0252805 | 1/1988 | European Pat. Off. . |
| 0290328 | 11/1988 | European Pat. Off. . |
| 3831644 | 3/1990 | Fed. Rep. of Germany ............ 267/140.12 |
| 8008049 | 7/1980 | France . |
| 2548972 | 1/1985 | France ................ 267/220 |
| 8714048 | 4/1989 | France . |

Primary Examiner—Robert J. Oberleitner
Assistant Examiner—Chris Schwartz
Attorney, Agent, or Firm—Thomas N. Ljungman

[57] ABSTRACT

A controllable elastic connection device for providing antivibration filtering having two different rigidities in a vehicle suspension system includes a piezo-rigid tubular chamber embedded in an elastomer compound block that is elastically connected between two fastening armatures, whereby the piezo-rigid tubular chamber is expandable under the action of a hydraulic pressure to increase the rigidity of the connection and thereby block the transverse deformability by a ratio of at least three.

6 Claims, 6 Drawing Sheets

ELASTIC CONNECTION DEVICE FOR MOTOR VEHICLE SUSPENSION SYSTEMS

BACKGROUND OF THE INVENTION

1. Field of the Invention

This invention relates to the field of elastomer-based elastic connectors which filter vibrations between a frame element of a motor vehicle, to which a suspension is fastened, and the rigid frame or body of the vehicle. Such an elastic connector enables the rigidity of the elastic connection to be modified as a function of conditions.

2. Background Information

The automobile industry is continuously attempting to improve the quality of the insulation of the passenger compartment against vibrations caused by the undercarriage, while simultaneously trying to improve the precision of the steering to thereby improve "road handling". In order to accomplish these improvements, new parts are being installed on modern vehicles to provide antivibration elasticity between the vehicle and the undercarriage, or "ground link".

However, the low rigidity that is required in all directions for the effective filtering of vibrations is generally not compatible with the powerful forces that can be transmitted statically and dynamically by the wheels. In particular, a rear suspension which is mounted elastically, i.e. with a certain flexibility, introduces, during turns, micro-deflections and changes in direction, which the designer must overcome by an appropriate modification of the kinematics, ensuring the wheel clearance.

As disclosed in European Patent No. 0 028 692 to Porsche, significant geometric deformations of the elastic filtering parts are acceptable, since their effect is offset in the trajectory, geometrically imposed by the kinematics of the deformable connections.

European Patent No. 0 252 805 to Automobiles Peugeot & Automobiles Citroën, proposes a rear suspension which has a pre-stressed transverse elastic connection, which connection, beyond a certain lateral acceleration threshold, rotates around an imaginary point. This rotation about an imaginary point induces an understeer effect caused by the rear suspension of the vehicle. This solution requires, as a result of the variations caused by the corresponding trajectory, the sudden change from one state of elastic equilibrium to another.

Another family of improvements for connection devices utilizes the change from a situation where the vibrations are effectively filtered in the presence of low forces, to another filtering situation which is significantly more rigid, in which the elastic parts absorb major steering forces by means of a rapid loss of the initial flexibility over a short stroke, which is translated by a veritable stop function, the disadvantage of which is a loss of filtering.

Examples of parts with rapidly variable rigidity are disclosed in French Patent 898 055 to Getefo, which patent explains the theory of operation, and French Patent 2 453 746 to General Motors, which illustrates the application of the theory for various elastically mounted suspension systems on vehicles.

The change from a situation in which the vibrations are effectively filtered to another situation where there is a less flexible connection therefore constitutes a compromise solution sought by automotive designers. However, such a compromise solution would essentially only provide effective filtering under certain conditions.

A third type of connecting device provides priority filtering in essentially two directions, including the essentially vertical direction bearing the principal load. This solution, however has the disadvantage that it achieves elastic connections in the two filtered directions, which connections are much more rigid than any connections in a third direction. Practically equivalent realizations of connecting devices are also proposed by French Patent No. 2 621 664 to Hutchinson and French Patent No. 2 622 660 to Caoutchouc Manufacturé et Plastiques, which corresponds to U.S. Pat. No. 4,854,562. The former discloses the use of a rod which is elastically articulated at its extremities, and the latter discloses a metal cable under tension, and embedded in an elastomer support. These two devices provide a high monodirectional rigidity, combined with a good level of filtering in any other direction.

A fourth type of connecting device, which operates under a totally different concept, is proposed by the use of a so-called "active" device which modifies the rigidities as a function of current conditions.

European Patent 0 290 328 (Régie Nationale des Usines Renault) recommends varying the natural rigidity of suspension elements, in particular of the motor mount, by using a shape-memory alloy embedded in the elastomer. The alloy can be heated by the passage of an electric current through the alloy to vary the rigidity of the device from one degree of rigidity to another. Such a device however can not provide instantaneous reaction since heating by means of electric control is typically slow and therefore the connection is unable to achieve an immediate response.

An analysis of the prior art apparently shows that the known elastic connection solutions are based on the passive displacement of the elastic system as a consequence of the accelerations applied. This displacement is translated by a time lag between the application of the force and the initiation, in reaction, of the appropriate rigidity. It therefore seems that the prior art does not include a device which reacts directly to the accelerations exerted, most particularly the lateral accelerations, and thereby participates in the immediate control of the trajectory of the vehicle.

OBJECT OF THE INVENTION

The object of the invention is therefore to overcome the disadvantages found in the various families of elastic parts described above, by taking advantage of the recent developments in the field of acceleration sensors and hydraulic activators.

SUMMARY OF THE INVENTION

The invention essentially consists of a controllable elastic connection device for a vehicle suspension system. The device according to the present invention can essentially provide filtering of vibrations in a given direction with two different rigidities. The device preferably has rigid fastening armatures which are preferably intimately bonded to an elastomer compound block, the elastomer block forming an elastic connection between the armatures.

The present invention is characterized by a piezo-rigid tubular chamber disposed within the elastomer compound block. A piezo-rigid tubular chamber is essentially a chamber which is deformable in the absence of pressure, but which is also able to block a major portion of the transverse deformability under the effect of a hydraulic pressure. A hydraulic pressure can be controlled by an activator relay, and can be admitted into a tubular assembly equipped with end pieces, where at least the piezo-rigid tubular chamber is preferably embedded in the mass of the elastomer compound block.

The invention results from the combination of elastic connection parts with a low volume enclosure, and the invention preferably consists of rigid metal or plastic armatures intimately bonded during vulcanization to an elastomer compound block which forms an elastic connection between them. The enclosure is essentially deformable in the absence of pressure, but can become rigid under the action of a large hydraulic pressure which is greater than all the stresses found within the material. The hydraulic pressure can be controlled by an activator acting as a hydraulic relay.

One aspect of the invention resides broadly in a hydraulically adjustable elastic connection device for a suspension of a motor vehicle, the connection device for being disposed between a frame of the motor vehicle and a suspension for a wheel of the motor vehicle to dampen transmission of vibrations therebetween. The connection device comprises a first fastening device and a second fastening device for fastening the connection device between the frame and the wheel suspension of the motor vehicle, and elastomer disposed between the first and the second fastening devices. At least a first portion of the elastomer for contacting at least a portion of each of the first and the second fastening devices. The connection also has an expandable chamber disposed at least adjacent the elastomer between the first and the second fastening devices and an apparatus for providing hydraulic pressure into the expandable chamber to expand the expandable chamber. The connection device has a first configuration in which the expandable chamber is in an unexpanded configuration. In this first configuration, at least a second portion of the elastomer is for being spaced apart from at least one of the first and the second fastening devices. The connection device in this first configuration has a first damping rigidity. The connection device also has a second configuration in which the expandable chamber is in an expanded configuration, the expandable chamber being configured to move at least the second portion of the elastomer into contact with at least one of the first and the second fastening device in the second expanded configuration, and the connection device in the second expanded configuration has a second damping rigidity, the second damping rigidity being greater than the first damping rigidity.

Another aspect of the invention resides broadly in a hydraulically adjustable elastic connection device for a suspension of a motor vehicle, the connection device for being disposed between a frame of the motor vehicle and a suspension for a wheel of the motor vehicle to dampen transmission of vibrations therebetween. The connection device comprises a first fastening device for being fastened to the frame of the motor vehicle, a second fastening device for being fastened to the suspension of the motor vehicle, and elastomer disposed between the first and the second fastening devices. At least a first portion of the elastomer is for contacting at least a portion of each of the first and the second fastening devices. The connection device also has an expandable chamber disposed at least adjacent the elastomer between the first and the second fastening device, apparatus for providing hydraulic pressure into the expandable chamber to expand the expandable chamber, and a device for controlling the apparatus for providing hydraulic pressure to provide hydraulic pressure to the expandable chamber. The connection device has a first configuration in which the expandable chamber is in an unexpanded configuration, and in which the connection device has a first damping rigidity, and a second configuration in which the expandable chamber is in an expanded configuration, the connection device in the expanded configuration having a second damping rigidity, and the second damping rigidity is greater than the first damping rigidity.

BRIEF DESCRIPTION OF THE DRAWINGS

The controlled elastic connection which is the object of the present invention, as well as variations of the present invention, will be explained in greater detail below, with reference to the accompanying drawings, in which:

FIG. 2a is an axial section, in a longitudinal plane of the vehicle, and FIG. 2b is a horizontal section in the cylindrical portion of the body of the elastic connection;

FIG. 3a and FIG. 3b are two perpendicular partial sections, in axial planes, while FIG. 3c is a plan view;

DESCRIPTION OF THE PREFERRED EMBODIMENTS

Figure 1:
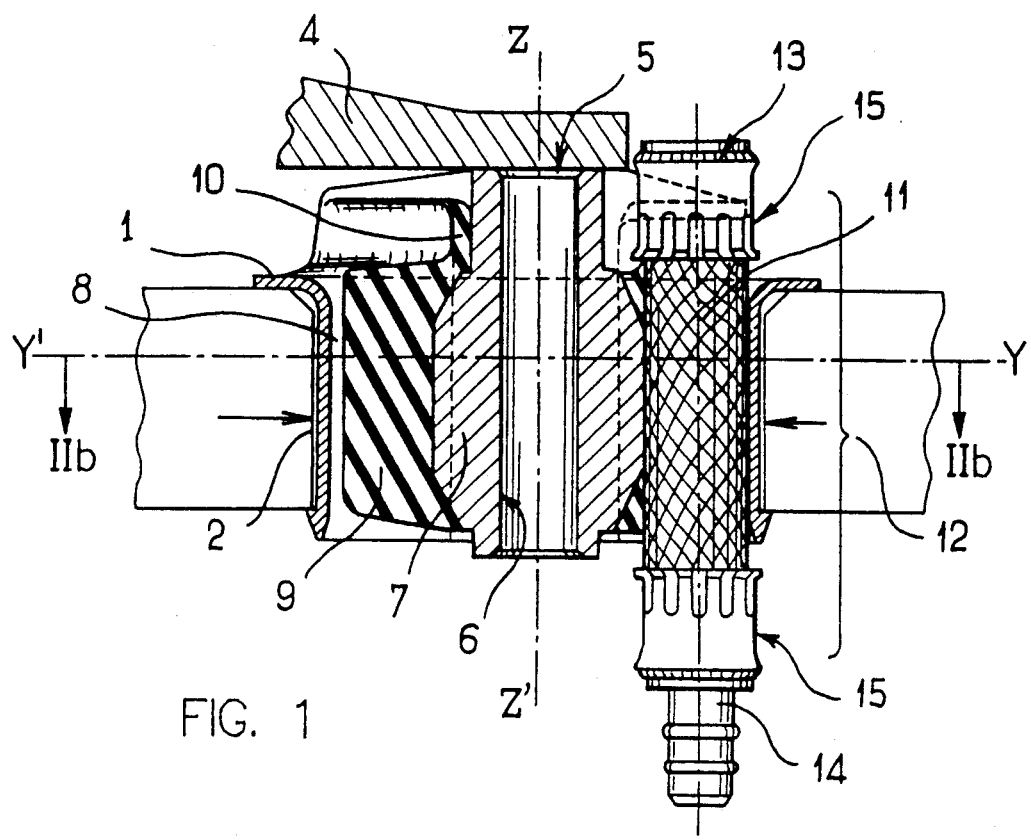
FIG. 1 is an axial section, in a plane transverse to the vehicle, of the elastic connection, in an embodiment where the piezo-rigid tubular chamber is oriented parallel to the vertical axis.

FIG. 1 shows an axial section, in a plane transverse to the vehicle in which the elastic connection is mounted, of an elastic connection of a suspension device in accordance with the present invention.

With an essentially cylindrical general shape, the damping connector according to FIG. 1, when attached at the two front points on a rigid frame supporting a rear suspension system, e.g. a rear suspension with trailing struts, can guarantee a high rigidity in the direction perpendicular to the Figure. When mounted in a motor vehicle, this direction which is perpendicular to the Figure is preferably a direction which is essentially parallel to the longitudinal direction of the vehicle after installation of the elastic connection on the rigid vehicle frame.

The elastic connection can most conveniently be fitted, by means of its exterior, or outer armature or frame 1, into a housing 2, which housing 2 can typically be formed as a part of the frame of the rear suspension system 3. Such an armature 1 and housing 2 can each have a corresponding circular shape to allow for adjustments to be made in the alignment of the connection in the housing. The orientation of the elastic connection in the housing 2, during installation, makes it possible to optimize the direction in which the greatest rigidity is to be applied, which direction can essentially be the longitudinal direction of the motor vehicle. This greatest rigidity provides, in particular, the reaction to the braking forces.

On the other hand, if a lateral force is applied to the front and rear supports of the frame 3 of the rear suspension system, a slight angular rotation is generally applied in addition to the overall transverse displacement. In some instances, the direction in which the rigidity is to be the most flexible is not necessarily transverse, and thus, the orientation of the exterior armature 1 in the cylindrical housing 2 can be optimized to provide for greater flexibility. This flexibility can be in the form of a rocking of the rear suspension frame 3 in relation to the vehicle frame, or chassis 4, and the rotations then generally can take place around an imaginary point far outside the rear suspension frame 3.

The vehicle chassis 4 typically exerts a slight thrust along axis Z-Z', against the upper side, or surface 5 of the connecting device. At this location, the connecting device can be secured to the chassis 4 by a bolt (not shown) which can pass through the fastening hole 6 of the internal armature, or frame 7. If the axis of the wheels is near the rear mountings of the rear suspension frame 3, but located between front and rear mountings, a moderate permanent load can make it possible to provide for a large vertical flexibility for the front mounts.

Consequently, a load, almost equal to that of the wheels, essentially dictates the selection of rigidities for the rear mounts, which rigidities are significantly greater and thus less filtering to the vibrations transmitted by means of the wheel struts. Nevertheless, the location of the roller bearings of the struts can be near the front mounts of the rear suspension frame 3, and thus the "noise route" for the vibrations can be longer between the wheel hub and the stiffer mounts, than between the wheel hub and the front mounts. This difference in the "noise routes" allows for significantly more effective filtering between the wheel hub and the front mounts.

This explains the desire for good flexibility, also in the essentially transverse direction (which is that of the Figure) in regular use on the vehicle.

The possibility of relative displacement can essentially be guaranteed by a clearance 8 between the exterior frame 1 and a boss 9 functioning as a stop. This boss 9 can preferably be a constituent element of the elastomer compound block 10. A ratio of rigidities on the order of four may be required between the two horizontal directions. In addition, the vertical rigidity, for example, can have a value which is intermediate between the two horizontal rigidities.

Since such great flexibilities can allow relative offsets of about 1 to 3 millimeters between the outside armature 1 and the internal armature, or frame 7, a proposed remedy for the directional instability which would then be caused by the excessive flexibility of the rear suspension consists of blocking the displacement due to the clearance 8, by means of a controlled pressurization of a piezo-rigid tubular chamber 11.

In the embodiment shown, the pressurization assembly is preferably equipped with tubular end piece, or assembly 12 and can have a piezo-rigid tubular chamber 11, cylindrical in shape, embedded in the mass of the block of elastomer compound 10.

Internal end parts, one functioning as an end plug 13, and the other as a feed nozzle 14, can be engaged in the two extremities of the cavity of the piezo-rigid tubular chamber 11 and can be tightened by tightening a circumferential collar 15. This tightening by collar 15 essentially guarantees a sealed closing of the tubular assembly 12, which assembly is preferably capable of resisting a high operating pressure, which can reach pressures of about 160 to about 180 bars.

Thus, in normal usage, the tubular assembly 12 will generally remain filled with liquid, but will not be under any pressure. In such an unpressurized configuration, the assembly 12 can generally exhibit a great flexibility in the direction which varies the clearance 8.

Under the action of a supply pressure, which supply pressure can be activated by the detection of lateral acceleration by means of a suitable logic system, the piezo-rigid tubular chamber 11, the shape of which, when unpressurized, can be slightly ovalized when it is placed in the elastomer compound block 10, preferably returns to a round shape. This change in shape results in the corresponding simultaneous shift of the equilibrium position, of the inner armature 7 within the exterior armature 1, thus eliminating the clearance 8. Consequently, the boss 9 can come into contact with the facing internal surface of the exterior armature 1.

The rigidity in the essentially transverse direction, i.e. in the plane of FIG. 1, can thus be increased, significantly and essentially instantaneously, by a factor of about at least three. Secondarily, these conditions generally can also slightly increase the vertical rigidity.

It should be noted that the return to a round shape of the piezo-rigid tubular chamber 11 when under pressure, which tubular chamber 11 assumes a high rigidity under the effect of the hydraulic pressure, nevertheless preferably does not crush the boss 9 against its support, but essentially establishes a new equilibrium position, independent of the value of the pressure, so that a certain filtering flexibility is nevertheless retained. The high pressure of the liquid contained in the tubular assembly therefore need not be controlled with precision, and consequently need only be the control pressure of an additional controllable mechanism, such as a hydraulic pump.

The control of the transverse rigidity therefore does not require specific detection, and thus, provides one of the least expensive opportunities available to a designer for controlling the filtering elasticities as a function of conditions.

Figure 2A:
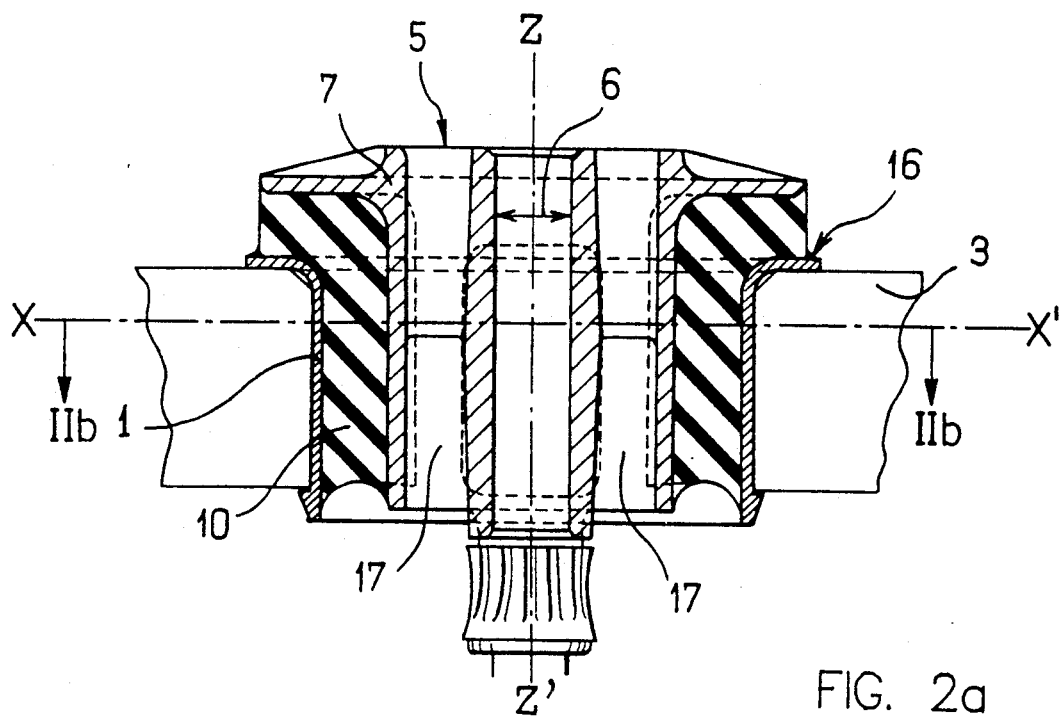
FIGS. 2a and 2b are additional illustrations of the embodiment shown in FIG. 1, in two sections perpendicular to the plane of FIG. 1.
Figure 2B:
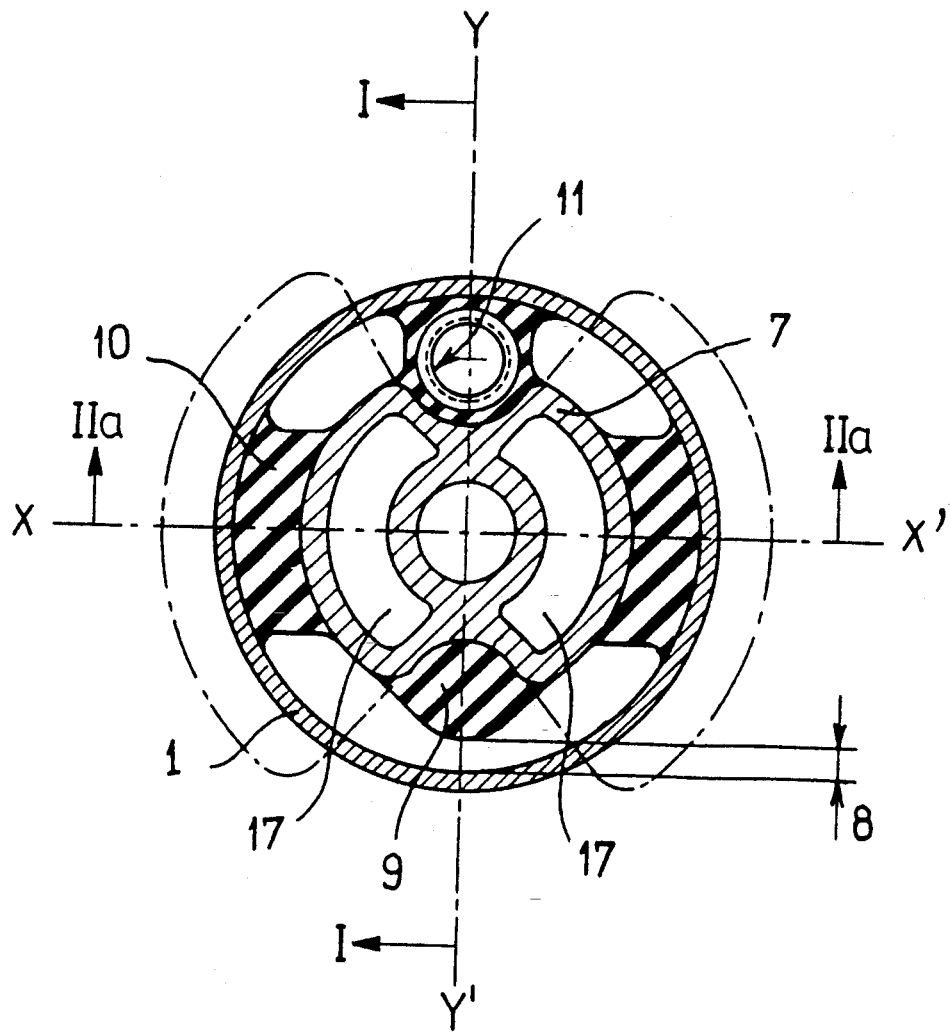

FIGS. 2a and 2b, show two sections perpendicular to the plane of FIG. 1, and supplement the embodiment described above. FIG. 2a is an axial section, in a plane which is essentially the longitudinal plane of the vehicle, indicated by the axis X-X' in FIG. 2b. This axis X-X' is essentially for being disposed in the direction of the highest permanent rigidity contributed by the elastomer compound block 10 to the elastic connection.

FIG. 2b is a horizontal section, halfway up the height of the body of the elastic connection, along II—II in FIGS. 1 and 2a, and thus essentially shows why the connection element has different rigidities in the X-X' direction as compared to the direction transverse to X-X', or Y-Y'.

FIG. 2a shows the full cross section of the elastomer compound block 10, whose shape factor, the ratio between the exposed surface and the surface enclosed by the exterior frame 1 and the internal frame 7, produces a high rigidity in compression and tension, which compression and tension is exerted through the elastomer compound.

The rigidity in the vertical direction, or Z-Z' essentially is provided by the shearing of the elastomer compound, and can remain a very effective filter, even if a flat collar 16 provides partial support, by compression of the upper part of the elastomer compound block 10 on the upper face of the rear suspension frame 3.

The action of gravity in this Z-Z' direction exerts a moderate static load, as a result of the contact of the vehicle chassis 4 on the upper surface 5 of the internal armature 7, since the greatest part of the load acts on the other mounting points of the rear suspension frame 3, located near the wheels.

Further, since there is also generally a constant desire by vehicle manufacturers to reduce the weight of the vehicle, the internal armature 7 can be provided with curved, or concave cavities 17 within the internal armature 7, on either side of the fastening hole 6. This modification can thus be done without modifying the intrinsic characteristics of the elastic connection.

FIG. 2b shows, in the horizontal plane of section II—II, a cross section of the elastic connection, in which elastic connection the elastomer compound block 10 is supported, for the forces exerted in the direction X-X', on the internal armature 7 in an area adjacent the concave cavities 17. In addition, in the perpendicular direction, i.e. essentially transversely, the boss 9 can be deflected into the clearance 8 until it essentially comes into contact against the interior wall of the external armature 1.

Since the piezo-rigid tubular chamber 11 has, in a rest configuration, a slightly flattened, or oval, configuration due to its support on the exterior armature 1, the tubular chamber 11 essentially functions, during the deflection of the boss 9 into the space 8, by losing its oval shape and taking on a preferably round configuration. To make the armature 7 essentially symmetrical, opposite the side on which the boss 9 is located, the internal armature 7 can have a corresponding hollowed shape into which the tubular chamber 11 partially fits.

Application of a high internal pressure into the piezo-rigid tubular chamber 11 can return the cross section of the tubular chamber 11 to a round shape, and by exerting several hundred Newtons of pressure, this pressurization can shift the boss 9 toward its contact with the exterior armature 1 by means of a transverse shearing of the elastomer compound block 10. This transverse shearing of the elastomer block 10 is preferably not very strong. The filtering, both in the direction of the lateral force and in the vertical direction, is not completely lost before the major forces act on the stop effect, but the corresponding rigidity is, for example, increased by a factor of about three before the exertion of these large forces.

Noting that the center-to-center distance of the internal armatures 7 of each of the left and right elastic connections of a vehicle is imposed by the location of the fastening of the armatures onto the vehicle chassis 4, and that the center-to-center distance of the exterior armatures 1 is imposed by the cylindrical housings 2 in the frame of the rear suspension 3, it would appear that the crushing of the boss 9 would cause a tendency to exert a traction, or tensile force, on the walls of the piezo-rigid tubular chamber 11 in the opposite elastic mounting.

In other words, the high rigidity, which reduces the filtering of vibrations, is thus produced by only one elastic fastening, i.e. the fastening on the side of the vehicle supporting the greater loads under a banking action, while the other side retains its good filtering properties.

Figure 3A:
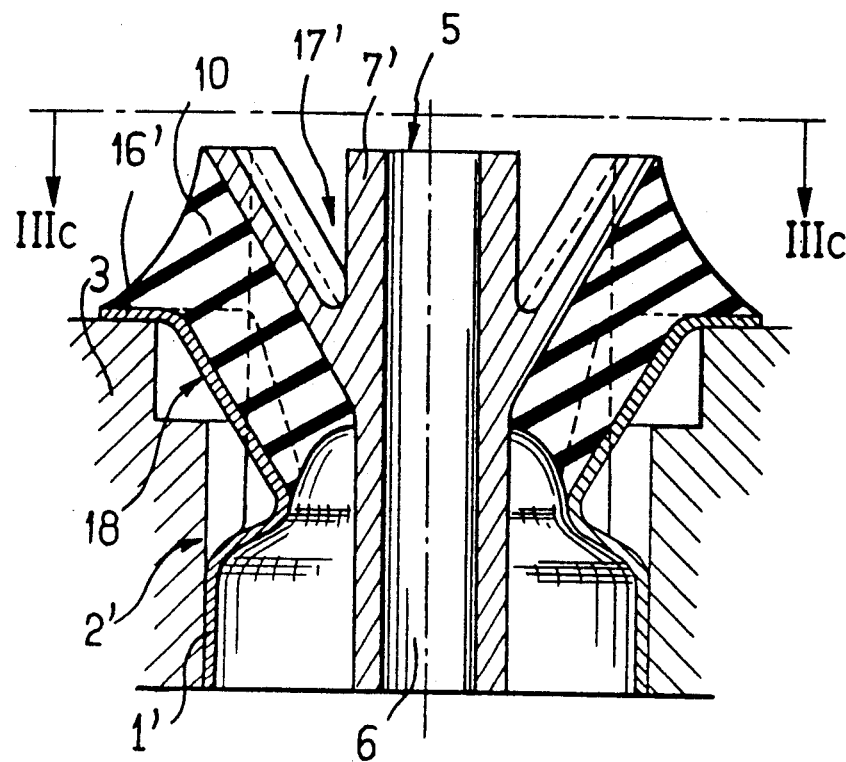
FIGS. 3a-3c illustrate an embodiment of the elastic connection including a tubular assembly, equipped with end pieces, which assembly is totally embedded in the mass of the elastomer compound block.
Figure 3B:
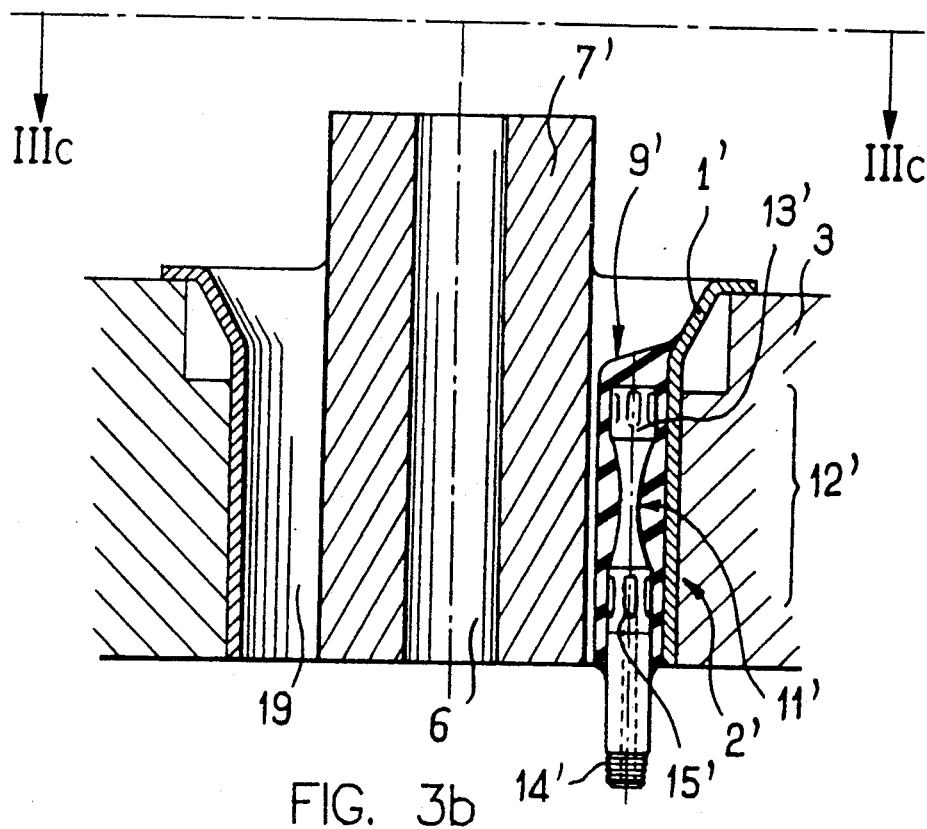
Figure 3C:
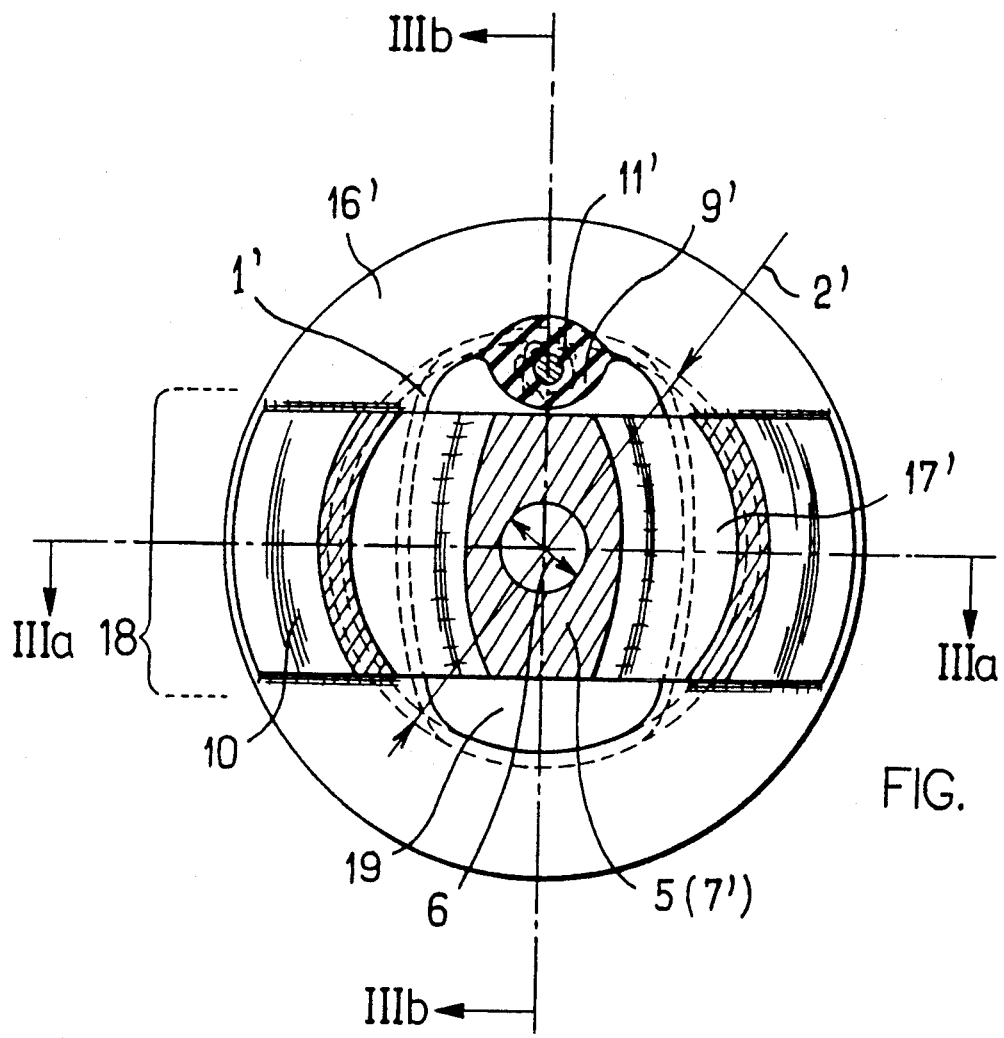

FIGS. 3a–3c relate to an embodiment of the elastic fastening, which embodiment can be used in a manner which is essentially the same as the embodiment described above, but the practical effect of which differs slightly. FIG. 3a shows a partial axial section in the direction of the greatest rigidity, which direction can theoretically be the longitudinal direction of the vehicle. FIG. 3b is a partial section, but in the transverse direction, i.e. essentially the transverse direction of the vehicle. An empty chamber, or cell 19, shown only partly in FIG. 3b, located opposite the piezo-rigid tubular chamber 11 is shown in more detail in the plan view in FIG. 3c.

The external armature 1' can preferably fit into a housing 2' of the rear suspension frame 3. The external armature 1' and the housing 2' can both have a circular shape to facilitate adjustment of the alignment of the connection within the housing 2'. The elastic connection is preferably fit into the housing 2' in a vertical direction, until it is stopped against the upper edge of the cylindrical housing 2' by the plane collar 16'. A conical zone 18 can be formed into the elastomer compound block 10, and this conical zone essentially results from a localized dishing of the exterior armature 1' and from the molding of the internal armature 7'.

Because of the conical shape, the elastomer compound block 10 can have two conical portions, one on each of the two sides of the central longitudinal axis Z-Z'. The conical portions can be disposed over two portions of the circumference of the exterior armature 1', with each portion having a length on the order of about one-quarter of the perimeter of exterior armature 1' of the connection device. These elastomer blocks 10 are preferably disposed between the two facing rigid surfaces, and are of essentially constant thickness. This conical shape gives the connector a significant form factor, and the resulting rigidity is capable of supporting a large vertical component of the load applied by the vehicle chassis 4 on the upper surface 5 of the internal armature 7'. This armature 7' can be connected to the chassis by bolting through the fastening hole 6.

The internal armature 7' can also have two hollow areas 17' which are disposed between the conical surfaces and the cylindrical part surrounding the fastening hole 6. As discussed above, these hollow areas can provide for a reduction in the weight of the connecting element.

In the arrangement shown in the transverse section, FIG. 3b, the empty chamber 19, fitted between the exterior armature 1' and the internal armature 7', can be located opposite a boss 9' which functions as a stop. In reality, a load is only applied to the boss 9' during transverse accelerations.

Inside the boss 9' there can preferably be embedded the tubular end piece, or assembly 12', which tubular assembly can be incorporated, along with its end plug 13' and its feed nozzle 14', inside the elastomer compound of the boss 9'.

When the lateral force makes the boss 9' come into contact against the body of the internal armature 7', the contact is directly on the loaded side of the elastomer compound, and is no longer in an antagonist position as in the embodiment described previously for FIG. 1, and thus, the pressurization of the piezo-rigid tubular chamber 11' increases the natural rigidity of the boss 9'.

In the absence of pressure, which pressure can be activated by an appropriate logic control, the deformability of the piezo-rigid tubular chamber 11' allows the boss 9' to deflect if necessary, until it is flattened, by pinching the piezo-rigid tubular chamber 11'.

This deformation accompanies the flexing of the elastic mounting, and the assembly thus described exhibits a rigidity in the transverse direction, e.g. a rigidity which in this case is about three times lower than the rigidity when the pressure is activated.

In addition, the deformability between the exterior armature 1' and the internal armature 7', according to the two conditions: absence of pressure; or round shape of the piezo-rigid tubular chamber 11' caused by the pressure; is geometrically more significant than in the embodiment of FIGS. 1, 2a and 2b, described above, and the deformability can thus modify the thickness of the boss 9' before it comes into contact with the internal armature 7'.

The piezo-rigid tubular chamber 11' can also be radially restricted, i.e. its diameter can be less than it was initially.

In the present embodiment, in spite of an arrangement analogous to that of the embodiment shown in FIG. 1, it is the stiffening of the boss 9' which produces the change of behavior in response to micro-deflections and changes in the direction of the suspension system, without changing the equilibrium position achieved by the elastic centering of the two armatures. This embodiment may therefore turn out to be less sensitive to fluctuations of the control pressure than the preceding embodiment of FIG. 1.

Figure 5A:
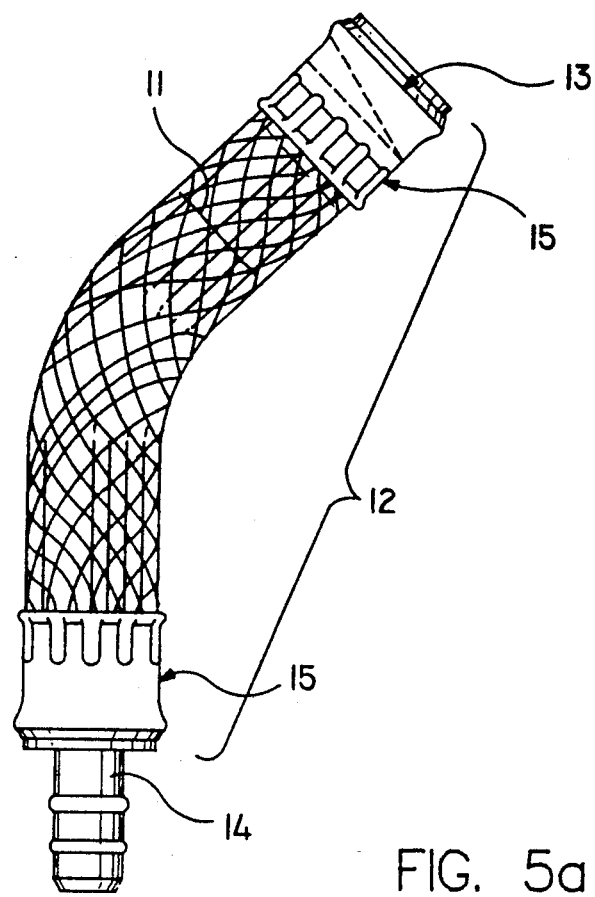
FIGS. 5a and 5b show bent configurations of the tubular assembly.
Figure 5B:
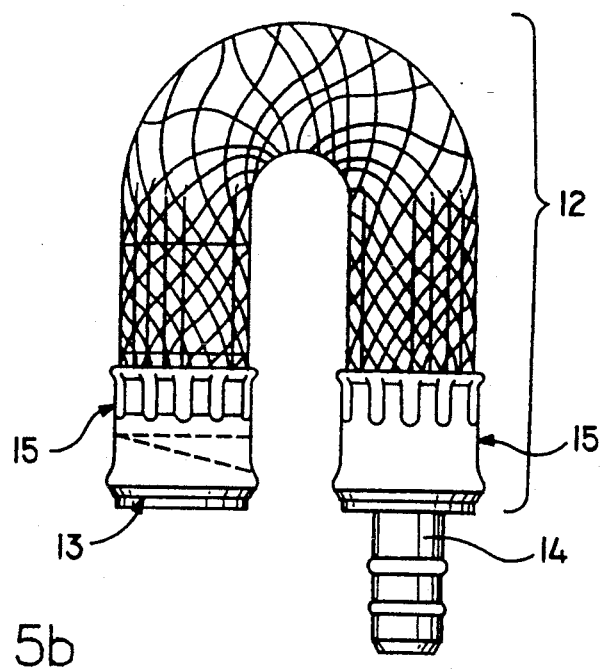

In additional embodiments, such as those shown in FIGS. 5a and 5b, the same variable rigidity capability can be achieved by a piezo-rigid tubular chamber bent or folded into the shape of a "U". Likewise, the positioning of variants of the piezo-rigid chamber 11 inside the elastomer compound block 10 can be orientated so that the chamber 11 is oriented in a direction other than the vertical.

The fabrication of the elastic connection providing filtering of vibrations for a suspension system according to the present invention uses conventional molding processes well known in the rubber transformation industry. In these processes, an intimate bond between the rigid armatures and an elastomer compound block can be created "in situ" during vulcanization. To accomplish this, the internal surface of the exterior armature 1 or 1' and the external surface of the internal armature 7 or 7' can be coated with the necessary adhesives and placed, along with the elastomer compound, in the appropriate mold. The molding process differs slightly, depending on the elastic connection embodiment to be realized.

For the embodiment illustrated in FIGS. 1, 2a and 2c, a given length of the piezo-rigid tubular chamber 11 can be engaged over a mandrel, which mandrel itself can be permanently fastened to the mold. The mandrel can essentially constitute a temporary internal core which is intended to withstand the molding pressure, and thus keep the piezo-rigid tubular chamber 11 from being crushed.

In the embodiment illustrated in FIGS. 3a-3c, prior to molding, the piezo-rigid tubular chamber 11' can be connected to an end plug 13' and to a feed nozzle 14', thus constituting the tubular chamber fitted with end pieces, or assembly 12', which tubular assembly 12' can be sealed by the tightening of circumferential collars 15'. An internal mandrel, the diameter of which is necessarily less than that of the piezo-rigid tubular chamber 11', can be threaded with the necessary clearances inside this assembly through the feed nozzle 14'. This mandrel essentially functions as an internal core and can thus limit the crushing of the tubular assembly 12' equipped with end pieces. The tubular assembly 12' can be locally tightened by the prior tightening of the circumferential collars 15'. When the mold is filled, it is this tubular assembly disposed about the mandrel which is preferably embedded in the elastomer compound of the boss 9', which elastomer compound of the boss 9' is preferably a constituent element of the elastomer compound block 10.

The next steps are the vulcanization of the elastomer compound block 10 and its simultaneous intimate bonding with the exterior armature 1 or 1' and internal armature 7 or 7', the unmolding and the extraction of the internal mandrel.

In the embodiment illustrated in FIGS. 1 and 2, the subsequent assembly on the piezo-rigid tubular chamber 11 of the end plug 13 and the feed nozzle 14, by the tightening of their circumferential collars 15, makes up the tubular assembly 12, which assembly is an essential element of the elastic connection according to the present invention.

Figure 4:
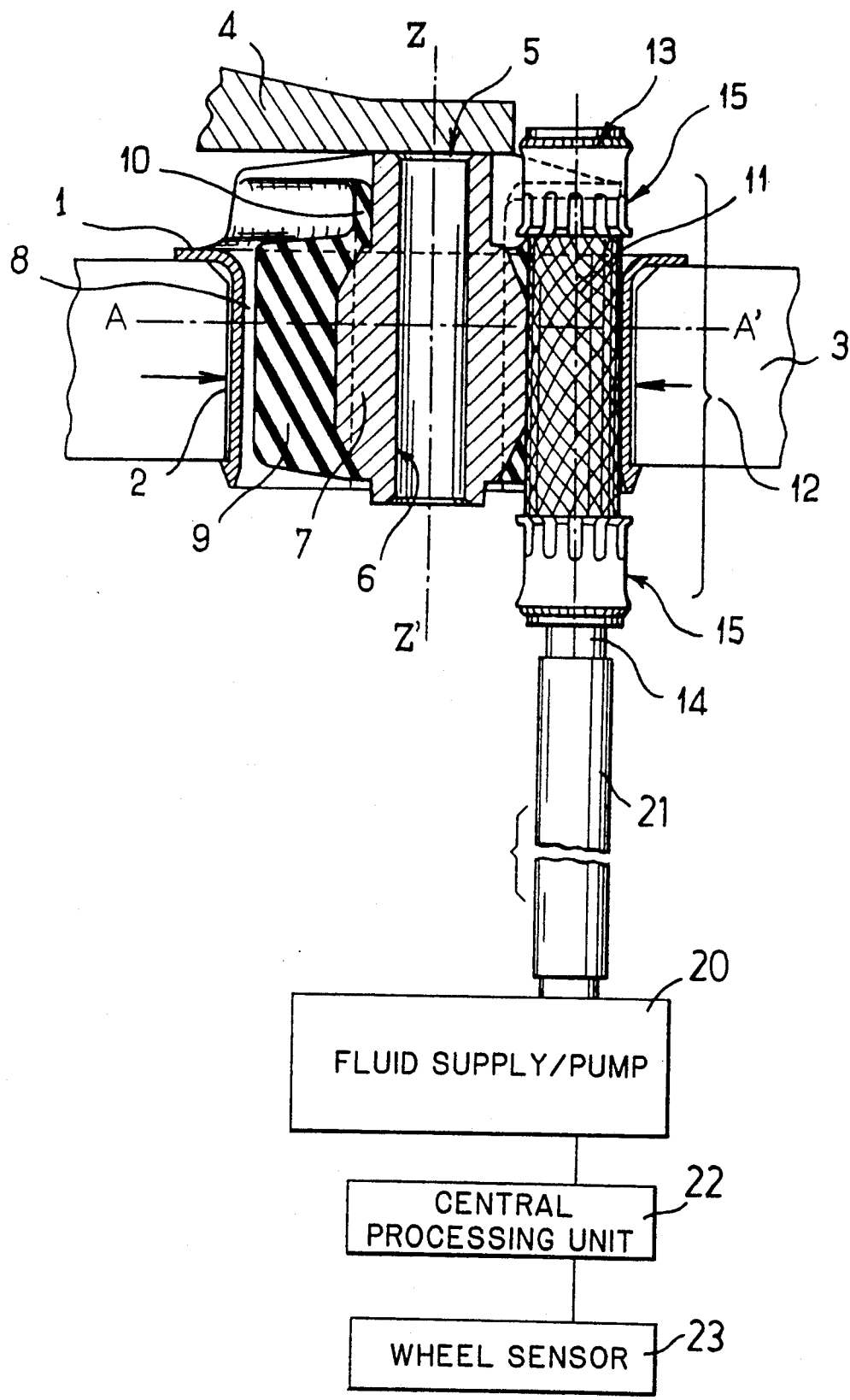
FIG. 4 is a schematic diagram showing the operation controls for the connection device according to FIG. 1.

FIG. 4 shows one possible means by which the elastic connection device can be controlled to alter the damping rigidity. The expandable tubular chamber 11 can be connected to a hydraulic fluid supply, or pump 20 by means of nozzle 14 and fluid supply line 21. Because of the high pressures involved upon pressurization of the tubular chamber 11, the supply line 21 should also be reinforced to be able to withstand any applied pressure. The fluid supply or pump 20 can be activated by a control device which may be a logic control 22, such as a central processing unit (CPU), which receives signals from a sensor 23, and outputs signals to the supply 20. The sensor 23 can be any type of sensor which detects movement parameters of the wheel, and in particular can be an acceleration sensor which measures lateral acceleration. Thus, for example, upon receipt of a signal by the CPU 23 indicating that there is increased lateral acceleration, the CPU 23 can send a signal to activate the fluid supply 20 to pressurize the tubular chamber 11 and increase the rigidity of the connection.

The tubular assembly 12, 12' can also have a bent configuration as shown in FIGS. 5a and 5b. Such configurations can assume the pressure effects of the hydraulic pressure while requiring less space under the chassis.

In summary, the controlled elastic connection device according to the present invention has the following advantages:
- it improves driving comfort and safety;
- it can be substituted, without modification, for passive elastic mountings of the suspension train of the prior art, and thereby makes possible the realization of a range of suspensions in a given line of vehicles;
- it does not require any specific lateral acceleration detection, but such detection devices can be included, at a slight additional cost, in an active control circuit for different filtering rigidities;
- its use is flexible with regard to the value of the control pressure, with an "all or nothing" effect, which allows it to change instantaneously from one rigidity to another.

One feature of the invention resides broadly in a controlled elastic connection device providing filtering of vibrations in a given direction, according to two different rigidities for a vehicle suspension system, the device including rigid fastening armatures intimately bonded to an elastomer compound block which elastically connects them, characterized by the fact that the elastomer compound block 10 has a piezo-rigid tubular chamber 11, 11', i.e. one which is deformable in the absence of pressure, but capable of blocking the major portion of transverse deformability under the action of a hydraulic pressure controlled by an activator relay and fed into a tubular assembly 12, 12' equipped with end pieces, at least the piezo-rigid tubular chamber 11, 11' of which is embedded in the mass of the elastomer compound block 10.

Another feature of the invention resides broadly in a controlled elastic connection device characterized by the fact that only the piezo-rigid tubular chamber 11 is embedded in the elastomer compound block 10, and by the fact that it is located opposite a boss functioning as a stop 9 which, under the action of the control pressure, eliminates the clearance 8, making contact with the wall of the exterior armature 1, the transverse rigidity thus being multiplied by a factor of at least three in relation to the rigidity of the device in the absence of pressure.

One additional feature of the invention resides broadly in a controlled elastic connection device characterized by the fact that the tubular assembly 12' equipped with end pieces is embedded in the elastomer compound block 10, and by the fact that it is included in the boss functioning as a stop 9' which, after the contact of the boss functioning as a stop 9' against the wall of the exterior armature 1', makes the transverse rigidity at least three times greater under the action of the control pressure than in the absence of the control pressure.

Another additional feature of the invention resides broadly in a controlled elastic connection device characterized by the fact that the internal armature 7, 7' includes, on either side of the fastening hole 6, a curved, hollow shape 17, 17', thereby reducing the weight of the device.

Another additional feature of the invention resides broadly in a controlled elastic connection device characterized by the fact that an empty cell 19 located between the exterior armature 1' and the internal armature 7' is located opposite the boss functioning as a stop 9'.

One other additional feature of the invention resides broadly in a controlled elastic connection device characterized by the fact that the piezo-rigid tubular chamber 11, 11' is bent into the shape of an elbow.

One more additional feature of the invention resides broadly in a controlled elastic connection device characterized by the fact that the piezo-rigid tubular chamber 11, 11' is bent or folded into the shape of a "U".

One further additional feature of the invention resides broadly in a controlled elastic connection device characterized by the fact that the orientation of the piezo-rigid tubular chamber 11, 11' inside the elastomer compound block 10 is other than vertical.

A technician skilled in the art will be able to use one or the other variant with control, without going beyond the context of the invention, by providing the high control pressure on one side only, or on both sides simultaneously, thereby possibly causing a shift of the equilibrium position, with a selection of two possible rigidity values, depending on the particular application, whatever the shape and orientation of the piezo-rigid tubular chamber.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically adjustable elastic connection device for a suspension of a motor vehicle, said connection device for being disposed between a frame of the motor vehicle and a suspension for a wheel of the motor vehicle to dampen transmission of vibrations therebetween, said connection device comprising:

first fastening means, said first fastening means comprising means for being fastened to the frame of the motor vehicle, said first fastening means comprising a first armature having a substantially tubular shape;

second fastening means, said second fastening means comprising means for being fastened to the suspension of the motor vehicle, said second fastening means comprising a second armature having a substantially tubular shape, said second armature being at least partially disposed within said first armature;

elastomer means disposed between said first and said second armature;

an expandable chamber disposed at least adjacent said elastomer means between said first and said second armature, at least a portion of said expandable chamber being disposed within said elastomer means;

said elastomer means comprising:
 a first portion contacting each of said first and said second armature, said first portion of said elastomer means is bonded to each of said first and said second armature; and
 a second portion disposed on one of said first and said second armature;

means for providing hydraulic pressure into said expandable chamber to expand said expandable chamber;

said connection device having a first configuration comprising said expandable chamber in an unexpanded configuration, said second portion of said elastomer means being spaced apart from the other of said first and said second armature to form a space therebetween in said first configuration, and said connection device in said first configuration having a first damping rigidity; and said connection device having a second configuration comprising said expandable chamber in an expanded configuration, said expandable chamber being configured to move said second portion of said elastomer means into contact with the other of said first and said second armature in said second expanded configuration, and said connection device in said second expanded configuration having a second damping rigidity, said second damping rigidity being greater than said first damping rigidity;

said connection device has a deformability in a direction transverse to the motor vehicle and said expandable chamber in said expanded configuration blocks a substantial portion of said deformability in the direction transverse to the motor vehicle;

said connection device has a first transverse axis and a second transverse axis substantially perpendicular to said first transverse axis;

said connection device, along said first transverse axis, has a first side portion and a second side portion;

said first armature is connected to said second armature by said first portion of said elastomer means at each of said first and said second side portions along said first transverse axis;

said connection device, along said second transverse axis, has a third side portion and a fourth side portion;

said at least a portion of said expandable chamber disposed within said elastomer means is disposed between said first armature and said second armature at one of said third and said fourth side portions;

said second portion of said elastomer means being disposed between said first armature and said second armature at the other of said third and said fourth side portions;

said expandable chamber comprises an expandable tube, said expandable tube having end pieces disposed at ends thereof, at least one of said end pieces comprising connecting means for connecting said expandable tube to said means for providing hydraulic pressure;

said second armature is at least partially hollow to reduce the weight of the connection device; and said connection device further comprises
means for controlling said means for providing hydraulic pressure, said means for controlling comprising sensor means for sensing a movement parameter, and central processing means for receiving a signal from said sensor means and outputting a signal to said means for controlling to pressurize and de-pressurize the expandable tube.

2. The connection device according to claim 1, wherein:

said expandable tube is at least one of:
straight;
bent;
bent into a U-shape;

said expandable tube is disposed between the first and second armatures in at least one of:
a direction parallel to a longitudinal axis of the connecting device; and
a direction offset at an angle to the longitudinal axis of the connecting device;

said second damping rigidity is at least about three times greater than said first damping rigidity;

said means for providing hydraulic pressure comprises a hydraulic fluid pump;

said sensor means is for sensing lateral acceleration of the wheel and upon sensing an increased lateral acceleration, signals said central processing means to expand said expandable tube to increase the rigidity of the connection device, and upon sensing a decreased lateral acceleration signals said central processing unit to de-pressurize said expandable tube to decrease the rigidity of the connection device;

said central processing unit comprises an activator relay;

said first armature is cylindrical and is for being disposed in a cylindrical housing in the frame of the motor vehicle, and said first armature is orientable within said housing to provide substantially optimal damping of said connection device; and said expandable tube is for receiving pressures of up to about 160 bar to about 180 bar to increase the rigidity of the connection device.

3. A hydraulically adjustable elastic connection device for a suspension of a motor vehicle, said connection device for being disposed between a frame of the motor vehicle and a suspension for a wheel of the motor vehicle to dampen transmission of vibrations therebetween, said connection device comprising:

first fastening means, said first fastening means comprising means for being fastened to the frame of the motor vehicle, said first fastening means comprising a first armature having a substantially tubular shape;

second fastening means, said second fastening means comprising means for being fastened to the suspension of the motor vehicle, said second fastening means comprises a second armature having a substantially tubular shape, said second armature being at least partially disposed within said first armature;

elastomer means disposed between said first and said second armature;

an expandable chamber disposed at least adjacent said elastomer means between said first and said second armature, at least a portion of said expandable chamber being disposed within said elastomer means;

said elastomer means comprising:
a first portion contracting each of said first and said second armature, said first portion of said elastomer means is bonded to each of said first and said second armature; and
a second portion disposed on one of said first and said second armature;

means for providing hydraulic pressure into said expandable chamber to expand said expandable chamber;

said connection device having a first configuration comprising said expandable chamber in an unexpanded configuration, said second portion of said elastomer means being spaced apart from the other of said first and said second armature to form a space therebetween in said first configuration, and said connection device in said first configuration having a first damping rigidity;

said connection device having a second configuration comprising said expandable chamber in an expanded configuration, said expandable chamber being configured to move said second portion of said elastomer means into contact with the other of said first and said second armature in said second expanded configuration, and said connection device in said second expanded configuration having a second damping rigidity, said second damping rigidity being greater than said first damping rigidity;

said connection device has a deformability in a direction transverse to the motor vehicle and said expandable chamber in said expanded configuration blocks a substantial portion of said deformability in the direction transverse to the motor vehicle;

said connection device has a first transverse axis and a second transverse axis substantially perpendicular to said first transverse axis;

said connection device, along said first transverse axis, has a first side portion and a second side portion;

said first armature is connected to said second armature by said first portion of said elastomer means at each of said first and said second side portions along said first transverse axis;

said connection device, along said second transverse axis, has a third side portion and a fourth side portion;

said at least a portion of said expandable chamber disposed within said elastomer means is disposed between said first armature and said second armature at one of said third and said fourth side portions;

said first armature is spaced apart from said second armature at the other of said third and said fourth side portions;

said at least a portion of said expandable chamber is disposed within said second portion of said elastomer means, said second portion of said elastomer means;

said second portion of said elastomer means disposed about said expandable chamber contacts each of said first armature and said second armature upon said connecting device being in said second configuration;

said expandable chamber comprises an expandable tube, said expandable tube having end pieces disposed at ends thereof, at least one of said end pieces comprising connecting means for connecting said expandable tube to said means for providing hydraulic pressure, and said expandable tube being entirely disposed within said elastomer means;

each of said first and said second armature comprises a top portion and the top portion of each of said first and said second armature comprising a substantially conical shape to increase a vertical rigidity of the connection device;

said second armature is at least partially hollow to reduce the weight of the connection device; and said connection device further comprises:
means for providing hydraulic pressure to said expandable chamber; and
means for controlling said means for providing hydraulic pressure, said means for controlling comprising sensor means for sensing a movement parameter, and central processing means for receiving a signal from said sensor means and outputting a signal to said means for controlling to pressurize and de-pressurize the expandable tube.

4. The connection device according to claim 3, wherein:
said expandable tube is at least one of:
straight;
bent;
bent into a U-shape;
said expandable tube is disposed between the armature in at least one of:
a direction parallel to a longitudinal axis of the connecting device; and
a direction offset at an angle to the longitudinal axis of the connecting device;
said second damping rigidity is at least about three times greater than said first damping rigidity;
said means for providing hydraulic pressure comprises a hydraulic fluid pump; and
said sensor means is for sensing lateral acceleration and upon sensing an increased lateral acceleration, signals said central processing means to expand said expandable tube to increase the rigidity of the connection device, and upon sensing a decreased lateral acceleration signals said central processing unit to de-pressurize said expandable tube to decrease the rigidity of the connection device.

5. A hydraulically adjustable elastic connection device for a suspension of a motor vehicle, said connection device for being disposed between a frame of the motor vehicle and a suspension for wheels of the motor vehicle to dampen transmission of vibrations therebetween, said connection device comprising:

first fastening means, said first fastening means comprising means for being fastened to the frame of the motor vehicle, said first fastening means comprising a first armature having a substantially tubular shape;

second fastening means, said second fastening means comprising means for being fastened to the suspension of the motor vehicle, said second fastening means comprises a second armature having a substantially tubular shape, said second armature being at least partially disposed within said first armature;

elastomer means disposed between said first and said second armature;

an expandable chamber disposed at least adjacent said elastomer means between said first and said second armature, at least a portion of said expandable chamber being disposed within said elastomer means;

said elastomer means comprising:
a first portion contacting each of said first and said second armature, said first portion of said elastomer means is bonded to each of said first and said second armature; and
a second portion disposed on one of said first and said second armature;

means for providing hydraulic pressure into said expandable chamber to expand said expandable chamber;

means for controlling said means for providing hydraulic pressure to provide hydraulic pressure to said expandable chamber;

said connection device having a first configuration comprising said expandable chamber in an unexpanded configuration, said connection device in said first configuration having a first damping rigidity;

said connection device having a second configuration comprising said expandable chamber in an expanded configuration, said connection device in said expanded configuration having a second damping rigidity, said second damping rigidity being greater than said first damping rigidity;

said connection device has a deformability in a direction transverse to the motor vehicle and said expandable chamber in said expanded configuration blocks a substantial portion of said deformability in the direction transverse to the motor vehicle;

said connection device has a first transverse axis and a second transverse axis substantially perpendicular to said first transverse axis;

said connection device, along said first transverse axis, has a first side portion and a second side portion;

said first armature is connected to said second armature by said first portion of said elastomer means at each of said first and said second side portions along said first transverse axis;

said connection device, along said second transverse axis, has a third side portion and a fourth side portion;

said at least a portion of said expandable chamber disposed within said elastomer means is disposed between said first armature and said second armature at one of said third and said fourth side portions;

said second portion of said elastomer means being disposed between said first armature and said second armature at the other of said third and said fourth side portions;

said second portion of said elastomer means on said at least one of said first armature and said second armature being spaced apart from the other of said first armature and said second armature to form a space therebetween upon said connecting device being in said first configuration;

said second portion of said elastomer means on said at least one of said first and said second armature contacts the other of said first and said second armature upon said connecting device being in said second configuration;.

said expandable chamber comprises an expandable tube, said expandable tube having end pieces disposed at ends thereof, at least one of said end pieces comprising connecting means for connecting said expandable tube to said means for providing hydraulic pressure;

said second armature is at least partially hollow to reduce the weight of the connection device; and said means for controlling said means for providing hydraulic pressure comprises an automatic control, and said automatic control comprises:
  sensor means for sensing a movement parameter; and
  central processing means for receiving a signal from said sensor means and outputting a signal to said means for controlling to pressurize and de-pressurize the expandable tube.

6. The connection device according to claim 5, wherein:

said expandable tube is at least one of:
  straight;
  bent;
  bent into a U-shape;

said expandable tube is disposed between the first and second armatures in at least one of:
  a direction parallel to a longitudinal axis of the connecting device; and
  a direction offset at an angle to the longitudinal axis of the connecting device;

said second damping rigidity is at least about three times greater than said first damping rigidity;

said means for providing hydraulic pressure comprises a hydraulic fluid pump;

said sensor means is for sensing lateral acceleration and upon sensing an increased lateral acceleration, signals said central processing means to expand said expandable tube to increase the rigidity of the connection device, and upon sensing a decreased lateral acceleration signals said central processing unit to de-pressurize said expandable tube to decrease the rigidity of the connection device;

said central processing unit comprises an activator relay;

said first armature is cylindrical and is for being disposed in a cylindrical housing in the frame of the motor vehicle, and said first armature is orientable within said housing to provide substantially optimal damping of said connection device; and said expandable tube is for receiving pressure of up to about 160 bar to about 180 bar to increase the rigidity of the connection device.

* * * * *

UNITED STATES PATENT AND TRADEMARK OFFICE
CERTIFICATE OF CORRECTION

PATENT NO.  : 5,259,600
DATED       : November 9, 1993
INVENTOR(S) : Etienne de FONTENAY and Patrick PARISOT It is certified that error appears in the above-indentified patent and that said Letters Patent is hereby corrected as shown below:

In column 14, line 49, Claim 3, after 'portion', delete "contracting" and insert --contacting--.

In column 16, lines 7 and 8, Claim 4, after 'the', delete "armature" and insert --armatures--.

Signed and Sealed this

Seventeenth Day of May, 1994

Attest:

BRUCE LEHMAN

*Attesting Officer*     Commissioner of Patents and Trademarks